(12) United States Patent
Boesen

(10) Patent No.: US 10,575,086 B2
(45) Date of Patent: Feb. 25, 2020

(54) SYSTEM AND METHOD FOR SHARING WIRELESS EARPIECES

(71) Applicant: BRAGI GmbH, München (DE)

(72) Inventor: Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/908,936

(22) Filed: Mar. 1, 2018

(65) Prior Publication Data

US 2018/0279038 A1    Sep. 27, 2018

Related U.S. Application Data

(60) Provisional application No. 62/475,014, filed on Mar. 22, 2017.

(51) Int. Cl.
*H04R 1/10*    (2006.01)
*H04W 76/10*    (2018.01)

(52) U.S. Cl.
CPC .......... *H04R 1/1091* (2013.01); *H04W 76/10* (2018.02); *H04R 2420/07* (2013.01)

(58) Field of Classification Search
CPC .............................. H04R 1/1091; H04W 76/10
See application file for complete search history.

(56) References Cited

U.S. PATENT DOCUMENTS

| 2,325,590 | A | 8/1943 | Carlisle et al. |
|---|---|---|---|
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |
| 3,696,377 | A | 10/1972 | Wall |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |

(Continued)

FOREIGN PATENT DOCUMENTS

| CN | 204244472 U | 4/2015 |
|---|---|---|
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Simon King
(74) *Attorney, Agent, or Firm* — Goodhue, Coleman & Owens, P.C.

(57) ABSTRACT

A method for using a set of wireless earpieces includes establishing a connection between each earpiece within the set of wireless earpieces, acquiring data indicative of a mode of operation, setting the mode of operation to operate the set of wireless earpieces based on the data indicative of the mode of operation and delivering audio to one or more speakers of each earpiece of the set of wireless earpieces based on the mode of operation.

20 Claims, 7 Drawing Sheets

(56) References Cited

U.S. PATENT DOCUMENTS

| | | |
|---|---|---|
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 11/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |

(56) References Cited

U.S. PATENT DOCUMENTS

| | | |
|---|---|---|
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0023417 A1* | 1/2009 | Davis ................ H04M 1/6066 455/403 |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |

(56) References Cited

U.S. PATENT DOCUMENTS

| | | |
|---|---|---|
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1* | 6/2017 | Perianu ................ H04W 76/10 |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2017/0374448 A1* | 12/2017 | Patel ................ H04R 1/1041 |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1994 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XP055334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Lets Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 11, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).

(56) References Cited

OTHER PUBLICATIONS

BRAGI Update—Developer Units, Investment, Story and Status(Nov. 21, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before the Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.orgiwiki/Wii_Balance_Board", 3 pages, (Jul. 20, 2017).

* cited by examiner

SYSTEM AND METHOD FOR SHARING WIRELESS EARPIECES

PRIORITY STATEMENT

This application claims priority to U.S. Provisional Patent Application No. 62/475,014, filed on Mar. 22, 2017, which is hereby incorporated by reference in its entirety.

BACKGROUND

I. Field of the Disclosure

The present invention relate to wireless earpieces. More specifically, but not exclusively, the present invention relate to a method of sharing wireless earpieces.

II. Description of the Art

One of the problems relating to a set of wireless earpieces relates to a lack of support for sharing. Two individuals may want to each wear one earpiece within a set of wireless earpieces. This may be problematic for a number of reasons. For example, each person may then hear only a left audio channel or a right audio channel. Some earpieces may not function if the distance between a left and right earpiece is greater than the distance across a person's head. Therefore, problems remain.

SUMMARY OF THE DISCLOSURE

One aspect provides a system and method for sharing wireless earpieces. A determination is made whether the wireless earpieces are being worn by at least two users. A signal between the wireless earpieces is enhanced. Audio communicated to the wireless earpieces is synchronized. Another embodiment provides wireless earpieces including a processor and a memory storing a set of instructions. The set of instructions are executed to perform the method described above.

Another aspect provides a set of wireless earpieces. Each wireless earpiece may include an earpiece housing to fit in an ear of a user. Each wireless earpiece may also include one or more processors for controlling functionality of the wireless earpiece. Each wireless earpiece may also include a number of sensors measuring biometrics and actions associated with the user. Each wireless earpiece may also include one or more transceivers managing communications with a wireless device.

Therefore, it is a primary object, feature, or advantage to improve over the state of the prior art.

It is a further object, feature, or advantage of the present invention to provide for a set of wireless earpieces which may be shared between two or more users.

Another object, feature, or advantage of the present invention is to acquire data from one or more components of a wireless earpiece that is indicative of a mode of operation of one or more of the wireless earpieces.

It is yet another object, feature, or advantage of the present invention to acquire data indicative of a mode of operation that includes biometric data for authenticating one or more users of the set of wireless earpieces.

It is yet another object, feature, or advantage of the present invention to set a mode of operation for a wireless earpiece based upon a distance between two or more earpieces of a set of wireless earpieces.

It is yet another object, feature, or advantage of the present invention to set a mode of operation for a wireless earpiece based upon a signal strength between two or more earpieces of a set of wireless earpieces.

It is yet another object, feature, or advantage of the present invention to dynamically adjust one or more connections between each of the earpieces of a set of wireless earpieces based upon a distance between each of the earpieces.

It is yet another object, feature, or advantage of the present invention to dynamically adjust one or more connections between each of the earpieces of a set of wireless earpieces based upon a signal strength of one or more of the connections.

It is yet another object, feature, or advantage of the present invention to set a power mode based upon a mode of operation of the set of wireless earpieces.

It is yet another object, feature, or advantage of the present invention to switch between a NFMI transceiver and a radio transceiver if a distance between one or more of the earpieces of a set of wireless earpieces exceeds a threshold.

It is yet another object, feature, or advantage of the present invention to switch between a NFMI transceiver and a radio transceiver if a signal strength associated with a connection between one or more of the earpieces of a set of wireless earpieces falls below a threshold.

According to another aspect, a method of using a set of wireless earpieces includes establishing a connection between each earpiece within the set of wireless earpieces, acquiring data indicative of a mode of operation, setting the mode of operation to operate the set of wireless earpieces based on the data indicative of the mode of operation and delivering audio to one or more speakers of each earpiece of the set of wireless earpieces based on the mode of operation. The mode of operation is from a set comprising a standard mode of operation and a shared mode of operation. In the standard mode of operation, the audio comprises a first audio signal delivered to at least one speaker of a first earpiece within the set of wireless earpieces and a second audio signal delivered to at least one speaker of a second earpiece within the set of wireless earpieces. In the shared mode of operation, the audio comprises a third audio signal based on the first audio signal and the second audio signal, the third audio signal delivered to at least one speaker of both the first earpiece within the set of wireless earpieces and the at least one second earpiece within the set of wireless earpieces.

One or more of the following features may be included. The data indicative of the mode of operation may include biometric information associated with at least one user. The connection may provide for bidirectional communication between each earpiece of the set of wireless earpieces. The third audio signal in the shared mode of operation may be dynamically adjusted based upon a distance between the first earpiece and the at least one second earpiece of the set of wireless earpieces. The distance may be determined from a signal strength associated with the connection. The third audio signal in the shared mode of operation may be dynamically adjusted based upon connection quality. The connection quality may relate to latency, lag, throughput, or error rate. A second connection may be established between the first earpiece of the set of wireless earpieces and a wireless device. The second connection in the shared mode of operation may be dynamically adjusted based upon a distance between the first earpiece and the wireless device. The determining of the distance between the first earpiece of the set of wireless earpieces and the wireless device may be based upon a signal strength associated with the second connection. A power mode may be set based on the mode of operation.

According to another aspect, each earpiece of a set of wireless earpieces includes an earpiece housing having an extension configured to fit substantially within an ear, a processor disposed within the earpiece housing, a plurality of sensors operatively connected to the processor and a transceiver operatively connected to the processor. The set of wireless earpieces are configured to establish a connection with each earpiece within the set of wireless earpieces, acquire data indicative with a mode of operation, set the mode of operation for operating the set of wireless earpieces based upon the data indicative of the mode of operation, and deliver audio to one or more speakers of each earpiece of the set of wireless earpieces based on the mode of operation. The mode of operation is from a set comprising a standard mode of operation and a shared mode of operation. In the standard mode of operation, the audio comprises a first audio signal delivered to at least one speaker of a first earpiece within the set of wireless earpieces and a second audio signal delivered to at least one speaker of a second earpiece within the set of wireless earpieces. In the shared mode of operation, the audio comprises a third audio signal based on the first audio signal and the second audio signal, the third audio signal delivered to at least one speaker of both the first earpiece within the set of wireless earpieces and the second earpiece within the set of wireless earpieces.

One or more of the following features may be included. One or more first sensors of the plurality of sensors for each earpiece may be located on the extension. One or more of the first sensor of the plurality of sensors for each earpiece may be an optical sensor for authenticating an identity. One or more second sensors of the plurality of sensors of each earpiece may be a global positioning sensor and the data indicative of the mode of operation may include global positioning data detected by the global positioning sensor of each earpiece for dynamically adjusting the connection. The third audio signal may be dynamically adjusted based upon a connection quality. The connection may provide for bidirectional communication between each earpiece of the set of wireless earpieces. The set of wireless earpieces may be configured to set a power mode based on the mode of operation. The first earpiece of the set of wireless earpieces may include a second transceiver for establishing a second connection with the second earpiece of the set of wireless earpieces if a distance based upon the global positioning data between the first earpiece and the second earpiece exceeds a threshold. The first earpiece of the set of wireless earpieces may be configured to establish a third connection with a wireless device via the second transceiver.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an object, feature, or advantage stated herein.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
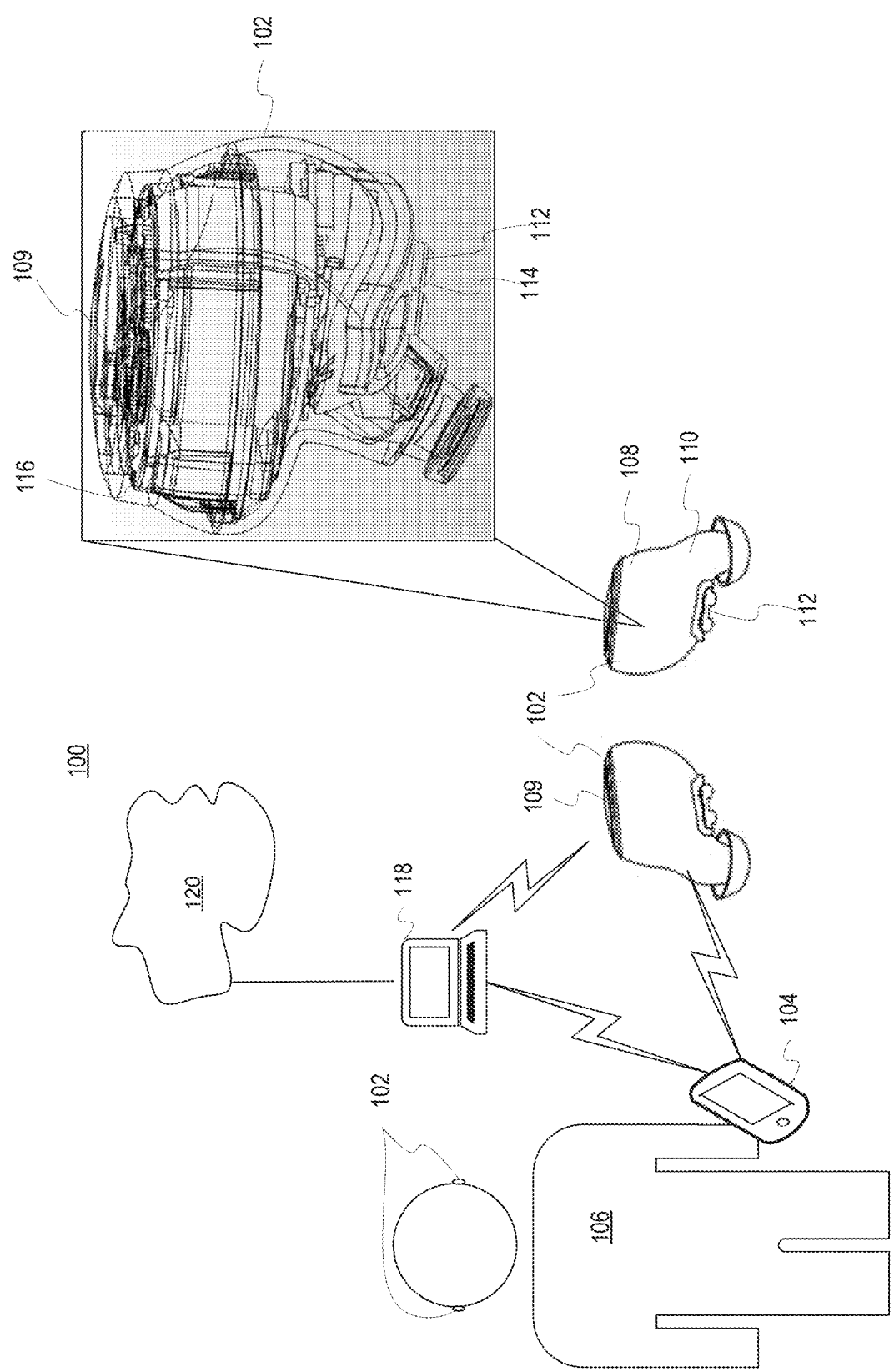
FIG. 1 is a pictorial representation of a communication environment in accordance with an illustrative embodiment.

The illustrative embodiments provide a system, method, wireless earpieces, and personal area network for sharing wireless earpieces. In one embodiment, the wireless earpieces may represent a set of wireless earpieces worn by a user for communications (e.g., phone or video calls), transcription, entertainment (e.g., listening to sound associated with audio, video, or other content), receiving biometric feedback, interaction with an application, the wireless earpieces, or an associated wireless device, or any number of other functions and utilizations. The user may separate the wireless earpieces for work, personal use, convenience, or so forth. In one embodiment, two individuals may want to share usage of the set of wireless earpieces and as a result, a left wireless earpiece may be given to one user and a right wireless earpiece may be given to another user. For example, the wireless earpieces may be separated between two teenage users to listen to music. In another example, the wireless earpieces may be separated by two business professionals so that they can both more discretely participate in a conference call made through an associated wireless device. In another example, the wireless earpieces may be separated for two children trying to quietly watch a cartoon movie on a tablet on an airplane. In another example, two friends jogging together may desire to both capture biometric, distance, speed, and other information that may be measured by the wireless earpieces alone, in combination, and/or utilizing a linked wireless device. There are innumerable examples of how the wireless earpieces may be utilized.

The wireless earpieces may be configured to automatically or manually determine that the wireless earpieces are being utilized by separate users. In one embodiment, the wireless earpieces may utilize biometrics, such as heart rate, skin conductivity, ear/facial mapping, voice recognition, or so forth to identify one or more of the users utilizing the wireless earpieces. The wireless earpieces may also utilize location, separate of the wireless earpieces, or other combinations of biometrics and information to determine that the wireless earpieces are being separately utilized.

The wireless earpieces may be automatically configured to function separately for two different users. In one embodiment, the transceivers utilized to communicate between wireless earpieces may amplify the signal to compensate for increased distances between the wireless earpieces. In another embodiment, the wireless earpieces may utilize separate transceivers when the wireless earpieces are worn by the user (e.g., switching from NFMI to Bluetooth/Wi-Fi in response to utilization by two users). The transceivers of the wireless earpieces may utilize distinct modes, channels, stacks, interfaces, or hardware to enable communications between the wireless earpieces, an associated wireless device, and so forth. For example, a dual mode Bluetooth transceiver may be utilized to expand the available separation distance for the wireless earpieces while also enabling communications with the associated wireless device (e.g., smart phone, tablet, etc.).

The wireless earpieces may also continue to perform biometric and environmental measurements for one or both of the users. The measurements may be logged, streamed, played to the respective user/both users, or otherwise communicated or saved. For example, the applicable information may be shared between the users based on user preferences, commands, settings, configurations, or other applicable information. One or both of the wireless earpieces may include one or more transceivers for communicating with an associated wireless device. For example, one of the wireless earpieces may be a master device that communicates with the other wireless earpiece as well as the associated wireless device(s). In another example, both of the wireless earpieces may be enabled and configured to communicate with one or more associated wireless device(s) as well as each other.

The wireless earpieces may act as an input/output device for providing voice, gesture, touch, or other input to control, manage, or interact with the wireless earpieces, associated wireless devices, systems, equipment, or components, and executed applications or software. The wireless earpieces may operate actively or passively to perform any number of tasks, features, and functions based on a user request, user preferences, or so forth. The wireless earpieces, methods, and described embodiments may represent hardware, software, firmware, or a combination thereof. The wireless earpieces may also be an integrated part of a virtual reality or augmented reality system.

Each of the wireless earpieces may be utilized to play music or audio, track user biometrics, perform communications (e.g., two-way, alerts, etc.), provide feedback/input, or any number of other tasks. The wireless earpieces may manage execution of software or sets of instructions stored in an on-board memory of the wireless earpieces to accomplish numerous tasks. The wireless earpieces may also be utilized to control, communicate, manage, or interact with a number of other computing, communications, or wearable devices, such as smart phones, laptops, personal computers, tablets, holographic displays, virtual reality systems, gaming devices, projection systems, vehicles, smart glasses, helmets, smart glass, watches or wrist bands, chest straps, implants, displays, clothing, or so forth. In one embodiment, the wireless earpieces may be integrated with, control, or otherwise communicate with a personal area network. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, near field magnetic induction (NFMI), Bluetooth, Z-Wave, ZigBee, Wi-Fi, ANT+ or other applicable radio frequency signals. In one embodiment, the personal area network may move with the user.

As noted, the wireless earpieces may include any number of sensors for reading user biometrics, such as pulse rate, blood pressure, blood oxygenation, temperature, orientation, calories expended, blood or sweat chemical content, voice and audio output, impact levels, and orientation (e.g., body, head, etc.). The sensors may also determine the user's location, position, velocity, impact levels, and so forth. The sensors may also receive user input and convert the user input into commands or selections made across the personal devices of the personal area network. For example, the user input detected by the wireless earpieces may include voice commands, head motions, finger taps, finger swipes, motions or gestures, or other user inputs sensed by the wireless earpieces. The user input may be received, parsed, and converted into commands associated with the input that may be utilized internally by the wireless earpieces or sent to one or more external devices, such as a tablet computer, smart phone, secondary wireless earpiece, or so forth. The wireless earpieces may perform sensor measurements for the user to read any number of user biometrics. The user biometrics may be analyzed including measuring deviations or changes of the sensor measurements over time, identifying trends of the sensor measurements, and comparing the sensor measurements to control data for the user.

The wireless earpieces may also measure environmental conditions, such as temperature, location, barometric pressure, humidity, radiation, wind speed, and other applicable environmental data. The wireless earpieces may also communicate with external devices to receive additional sensor measurements. The wireless earpieces may communicate with external devices to receive available information, which may include information received through one or more networks, such as the Internet. The detection of biometrics and environmental information may be enhanced utilizing each of the wireless earpieces of a set as a measurement device. In addition, the separate measurements may be utilized for mapping or otherwise distinguishing applicable information.

FIG. 1 is a pictorial representation of a communications environment 100 in accordance with an illustrative embodiment. The wireless earpieces 102 may be configured to communicate with each other and with one or more wireless devices, such as a wireless device 104, a personal computer 118, or another set or individual wireless earpieces (not shown). The wireless earpieces 102 may be worn by a user 106 and are shown both as worn and separately from their positioning within the ears of the user 106 for purposes of visualization. A block diagram of the wireless earpieces 102 is further shown in FIG. 4 to illustrate components and operation of the wireless earpieces 102. As subsequently described, the wireless earpieces 102 may be separated for utilization by a first user, such as user 106, and a second user (not shown). The applicable functionality, utilization, description, and so forth is applicable to the user 106 or multiple users (e.g., a first user and a second user). For example, description applicable to the user 106 may be applicable to multiple users when the wireless earpieces 102 are separated as is herein contemplated, described, and shown.

In one embodiment, the wireless earpieces 102 includes an earpiece housing 108 shaped to fit substantially within the ears of the user 106. The earpiece housing 108 is a support structure that at least partially encloses and houses the electronic components of the wireless earpieces 102. The earpiece housing 108 may be composed of a single structure or multiple structures that are interconnected. An exterior portion of the wireless earpieces 102 may include a first set of sensors shown as infrared sensors 109. The infrared sensors 109 may include emitter and receivers that detects and measures infrared light radiating from objects in their field of view. The infrared sensors 109 may detect gestures, touches, or other user input against an exterior portion of the wireless earpieces 102 that is visible when worn by the user 106. The infrared sensors 109 may also detect infrared light or motion. The infrared sensors 109 may be utilized to determine whether the wireless earpieces 102 are being worn, moved, approached by a user, set aside, stored in a smart case, placed in a dark environment, or so forth.

The earpiece housing 108 defines an extension 110 configured to fit substantially within the ear of the user 106. The extension 110 may include one or more speakers or vibration components for interacting with the user 106. The extension 110 may be removable covered by one or more sleeves. The sleeves may be changed to fit the size and shape of the user's ears. The sleeves may come in various sizes and have extremely tight tolerances to fit the user 106 and one or more other users that may utilize the wireless earpieces 102 during their expected lifecycle. In another embodiment, the sleeves may be custom built to support the interference fit utilized by the wireless earpieces 102 while also being comfortable while worn. The sleeves are shaped and configured to not cover various sensor devices of the wireless earpieces 102. Separate sleeves may be utilized if different users are wearing the wireless earpieces 102.

In one embodiment, the earpiece housing 108 or the extension 110 (or other portions of the wireless earpieces 102) may include sensors 112 for sensing pulse, blood oxygenation, temperature, voice characteristics, skin conduction, glucose levels, impacts, activity level, position, location, orientation, as well as any number of internal or external user biometrics. In other embodiments, the sensors 112 may be positioned to contact or be proximate the epithelium of the external auditory canal or auricular region of the user's ears when worn. For example, the sensors 112 may represent various metallic sensor contacts, optical interfaces, or even micro-delivery systems for receiving, measuring, and delivering information and signals. Small electrical charges or spectroscopy emissions (e.g., various light wavelengths) may be utilized by the sensors 112 to analyze the biometrics of the user 106 including pulse, blood pressure, skin conductivity, blood analysis, sweat levels, and so forth. In one embodiment, the sensors 112 may include optical sensors that may emit and measure reflected light within the ears of the user 106 to measure any number of biometrics. The optical sensors may also be utilized as a second set of sensors to determine when the wireless earpieces 102 are in use, stored, charging, or otherwise positioned.

The sensors 112 may be utilized to provide relevant information that may be communicated through the virtual assistant. As described, the sensors 112 may include one or more microphones that may be integrated with the earpiece housing 108 or the extension 110 of the wireless earpieces 102. For example, an external microphone may sense environmental noises as well as the user's voice as communicated through the air of the communications environment 100. An ear-bone or internal microphone may sense vibrations or sound waves communicated through the head of the user 102 (e.g., bone conduction, etc.). In other embodiments, the wireless earpieces 102 may not have sensors 112 or may have very limited sensors.

In some applications, temporary adhesives or securing mechanisms (e.g., clamps, straps, lanyards, extenders, wires, etc.) may be utilized to ensure that the wireless earpieces 102 remain in the ears of the user 106 even during the most rigorous and physical activities or to ensure that if they do fall out they are not lost or broken. For example, the wireless earpieces 102 may be utilized during marathons, swimming, team sports, biking, hiking, parachuting, or so forth. The wireless earpieces 102 may be shared during any number of sports, communications, recreational, business, military, training, or other activities or actions. In one embodiment, miniature straps may attach to the wireless earpieces 102 with a clip on the strap securing the wireless earpieces to the clothes, hair, or body of the user. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless earpieces 102 may also execute any number of applications to perform specific purposes. The wireless earpieces 102 may be utilized with any number of automatic assistants, such as Siri, Cortana, Alexa, Google, Watson, or other smart assistants/artificial intelligence systems.

The communications environment 100 may further include the personal computer 118. The personal computer 118 may communicate with one or more wired or wireless networks, such as a network 120. The personal computer 118 may represent any number of devices, systems, equipment, or components, such as a laptop, server, tablet, medical system, gaming device, virtual/augmented reality system, or so forth. The personal computer 118 may communicate utilizing any number of standards, protocols, or processes. For example, the personal computer 118 may utilize a wired or wireless connection to communicate with the wireless earpieces 102, the wireless device 104, or other electronic devices. The personal computer 118 may utilize any number of memories or databases to store or synchronize biometric information associated with the user 106, data, passwords, or media content.

The wireless earpieces 102 may determine their position with respect to each other as well as the wireless device 104 and the personal computer 118. For example, position information for the wireless earpieces 102 and the wireless device 104 may determine proximity of the devices in the communications environment 100. For example, global positioning information or signal strength/activity may be utilized to determine proximity and distance of the devices to each other in the communications environment 100. In one embodiment, the distance information may be utilized to determine whether biometric analysis may be displayed to a user. For example, the wireless earpieces 102 may be required to be within four feet of the wireless device 104 and the personal computer 118 in order to display biometric readings or receive user input. The transmission power or amplification of received signals may also be varied based on the proximity of the devices in the communications environment 100. For example, if different users are wearing the wireless earpieces 102, the signal strength may be increased or decreased based on the relative distance between the wireless earpieces to enable communications with one another or an associated wireless device.

In one embodiment, the wireless earpieces 102 and the corresponding sensors 112 (whether internal or external) may be configured to take a number of measurements or log information and activities during normal usage. This information, data, values, and determinations may be reported to the user(s) or otherwise utilized. The sensor measurements may be utilized to extrapolate other measurements, factors, or conditions applicable to the user 106 or the communications environment 100. For example, the sensors 112 may monitor the user's usage patterns or light sensed in the communications environment 100 to enter a full power mode in a timely manner. The user 106 or another party may configure the wireless earpieces 102 directly or through a connected device and app (e.g., mobile app with a graphical user interface) to set power settings (e.g., preferences, conditions, parameters, settings, factors, etc.) or to store or share biometric information, audio, and other data. In one embodiment, the user may establish the light conditions or motion that may activate the full power mode or that may keep the wireless earpieces 102 in a sleep or low power mode. As a result, the user 106 may configure the wireless earpieces 102 to maximize the battery life based on motion, lighting conditions, and other factors established for the user 106. For example, the user 106 may set the wireless earpieces 102 to enter a full power mode only if positioned within the ears of the user 106 within ten seconds of being moved, otherwise the wireless earpieces 102 remain in a low power mode to preserve battery life. This setting may be particularly useful if the wireless earpieces 102 are periodically moved or jostled without being inserted into the ears of the user 106.

The user 106 or another party may also utilize the wireless device 104 to associate user information and conditions with the user preferences. For example, an application executed by the wireless device 104 may be utilized to specify the conditions that may "wake up" the wireless earpieces 102 to automatically or manually communicate information, warnings, data, or status information to the user. In addition, the enabled functions (e.g., sensors, transceivers, vibration alerts, speakers, lights, etc.) may be selectively activated based on the user preferences as set by default, by the user, or based on historical information. In another embodiment, the wireless earpieces 102 may be adjusted or trained over time to become even more accurate in adjusting to habits, requirements, requests, activations, or other processes or functions performed. For example, in response to detecting the wireless earpieces 102 are worn by a first user and a second user the wireless earpieces 102 may enable direction communications as well as synchronize and share played audio. The wireless earpieces 102 may utilize historical information to generate default values, baselines, thresholds, policies, or settings for determining when and how the virtual assistant performs various communications, actions, and processes. As a result, the wireless earpieces 102 may effectively manage the automatic and manually performed processes of the wireless earpieces 102 based on automatic detection of events and conditions (e.g., light, motion, user sensor readings, etc.) and user specified settings.

The wireless earpieces 102 may include any number of sensors 112 and logic for measuring and determining user biometrics, such as pulse rate, skin conduction, blood oxygenation, temperature, calories expended, blood or excretion chemistry, voice and audio output, position, and orientation (e.g., body, head, etc.). The sensors 112 may also determine the user's location, position, velocity, impact levels, and so forth. Any of the sensors 112 may be utilized to detect or confirm light, motion, or other parameters that may affect how the wireless earpieces 102 manage, utilize, and initialize the virtual assistant. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces. The user input may be determined by the wireless earpieces 102 and converted into authorization commands that may be sent to one or more external devices, such as the wireless device 104, the personal computer 118, a tablet computer, secondary wireless earpieces, or so forth. For example, the user 106 may create a specific head motion and voice command that when detected by the wireless earpieces 102 are utilized to send a request to a virtual assistant (implemented by the wireless \ earpieces 102/wireless device 104) to tell the user 106 her current heart rate, speed, and location. Any number of actions may also be implemented by the virtual assistant or logic of the wireless earpieces 102 in response to specified user input.

The sensors 112 may make all of the measurements with regard to the user 106 and communications environment 100 or may communicate with any number of other sensory devices, components, or systems in the communications environment 100. In one embodiment, the communications environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, components, equipment, and systems, such as personal computers, communications devices, cameras, vehicles, entertainment/media devices, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 106.

In other embodiments, the communications environment 100 may include any number of devices, components, or so forth that may communicate with each other directly or indirectly through a wireless (or wired) connection, signal, or link. The communications environment 100 may include one or more networks and network components and devices represented by the network 120, such as routers, servers, signal extenders, intelligent network devices, computing devices, or so forth. In one embodiment, the network 120 of the communications environment 100 represents a personal area network as previously disclosed. The virtual assistant herein described may also be utilized for any number of devices in the communications environment 100 with commands or communications being sent to and from the wireless earpieces 102, wireless device 104, personal computer 118 or other devices of the communications environment 100.

Communications within the communications environment 100 may occur through the network 120 or a Wi-Fi network or may occur directly between devices, such as the wireless earpieces 102 and the wireless device 104. The network 120 may communicate with or include a wireless network, such as a Wi-Fi, cellular (e.g., 3G, 4G, 5G, PCS, GSM, etc.), Bluetooth, or other short range or long range radio frequency networks, signals, connections, or links. The network 120 may also include or communicate with any number of hard wired networks, such as local area networks, coaxial networks, fiber-optic networks, network adapters, or so forth. Communications within the communications environment 100 may be operated by one or more users, service providers, or network providers.

The wireless earpieces 102 may play, display, communicate, or utilize any number of alerts or communications to indicate that the actions, activities, communications, mode, or status in use or being implemented by the virtual assistant. For example, one or more alerts may indicate when the wireless earpieces 102 are separated for utilization by different users, such as an audio alert indicating "sharing mode is activated." The alerts may include any number of tones, verbal acknowledgements, tactile feedback, or other forms of communicated messages. For example, an audible alert and LED flash may be utilized each time one of the wireless earpieces 102 activate the virtual assistant to receive user input. Verbal or audio acknowledgements, answers, and actions utilized by the wireless earpieces 102 are particularly effective because of user familiarity with such devices in standard smart phone and personal computers. The corresponding alert may also be communicated to the user 106, the wireless device 104, and the personal computer 118.

In other embodiments, the wireless earpieces 102 may also vibrate, flash, play a tone or other sound, or give other indications of the actions, status, or processes being implemented. The wireless earpieces 102 may also communicate an alert to the wireless device 104 that shows up as a notification, message, in-app alert, or other indicator indicating changes in status, actions, commands, or so forth.

The wireless earpieces 102 as well as the wireless device 104 may include logic for automatically implementing a sharing mode in response to motion, light, user activities, user biometric status, user location, user position, historical activity/requests, or various other conditions and factors of the communications environment 100. During the sharing mode the wireless earpieces 102 may be activated to perform a specified activity or to "listen" or be prepared to "receive" user input, feedback, or commands for implementation.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, NFMI, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sensor data sent from the wireless earpieces 102. For example, the wireless device 104 may represent any number of android, iOS, Windows, open platforms, or other systems and devices. Similarly, the wireless device 104 or the wireless earpieces 102 may execute any number of standard or specialized applications that utilize the user input, proximity data, biometric data, and other feedback from the wireless earpieces 102 to initiate, authorize, or perform the associated tasks.

As noted, the layout of the internal components of the wireless earpieces 102 and the limited space available for a product of limited size may affect where the sensors 112 may be positioned. The positions of the sensors 112 within each of the wireless earpieces 102 may vary based on the model, version, and iteration of the wireless earpieces 102 design and manufacturing process.

Figure 2:
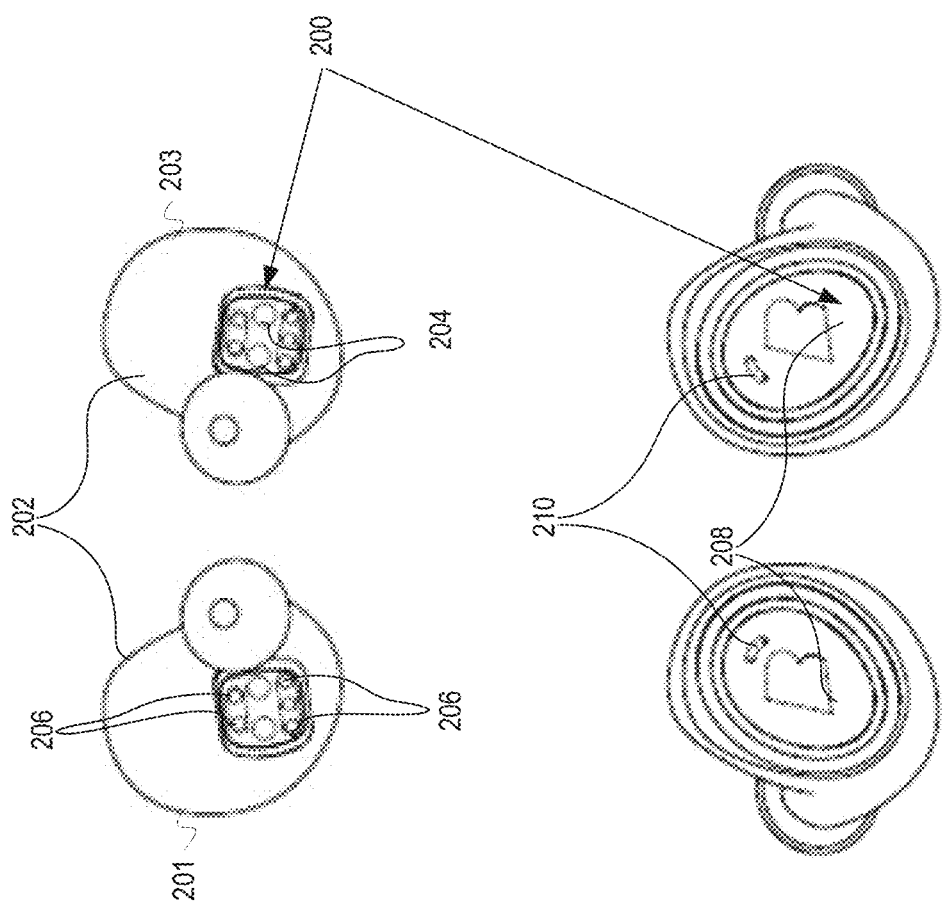
FIG. 2 is a pictorial representation of some of the sensors of the wireless earpieces in accordance with illustrative embodiments.

FIG. 2 is a pictorial representation of some of the sensors 200 of the wireless earpieces 202 in accordance with illustrative embodiments. As shown the wireless earpieces 202 may include a left wireless earpiece 201 and a right wireless earpiece 203 representative of a set of wireless earpieces. In other embodiments, a set of wireless earpieces may include a number of left wireless earpieces 201 and right wireless earpieces 203. The illustrative embodiments may also be applicable to large numbers of wireless earpieces and may communicate directly or indirectly (e.g., mesh networking) with each other a wireless hub/wireless device or so forth.

As previously noted, the wireless earpieces 202 may include any number of internal or external sensors. In one embodiment, the sensors 200 may be utilized to determine environmental information and whether the wireless earpieces are being utilized by different users. Similarly, any number of other components or features of the wireless earpieces 202 may be managed based on the measurements made by the sensors 200 to preserve resources (e.g., battery life, processing power, etc.). The sensors 200 may make independent measurements or combined measurements utilizing the sensory functionality of each of the sensors 200 to measure, confirm, or verify sensor measurements.

In one embodiment, the sensors 200 may include optical sensors 204, contact sensors 206, infrared sensors 208, and microphones 210. The optical sensors 204 may generate an optical signal that is communicated to the ear (or other body part) of the user and reflected back. The reflected optical signal may be analyzed to determine blood pressure, pulse rate, pulse oximetry, vibrations, blood chemistry, and other information about the user. The optical sensors 204 may include any number of sources for outputting various wavelengths of electromagnetic radiation and visible light. Thus, the wireless earpieces 202 may utilize spectroscopy as it is known in the art and developing to determine any number of user biometrics.

The optical sensors 204 may also be configured to detect ambient light proximate the wireless earpieces 202. In one embodiment, the optical sensors 204 may also include an externally facing portion or components. For example, the optical sensors 204 may detect light and light changes in an environment of the wireless earpieces 202, such as in a room where the wireless earpieces 202 are located. The optical sensors 204 may be configured to detect any number of wavelengths including visible light that may be relevant to light changes, approaching users or devices, and so forth.

In another embodiment, the contact sensors 206 may be utilized to determine that the wireless earpieces 202 are positioned within the ears of the user. For example, conductivity of skin or tissue within the user's ear may be utilized to determine that the wireless earpieces are being worn. In other embodiments, the contact sensors 206 may include pressure switches, toggles, or other mechanical detection components for determining that the wireless earpieces 202 are being worn. The contact sensors 206 may measure or provide additional data points and analysis that may indicate the biometric information of the user. The contact sensors 206 may also be utilized to apply electrical, vibrational, motion, or other input, impulses, or signals to the skin of the user.

The wireless earpieces 202 may also include infrared sensors 208. The infrared sensors 208 may be utilized to detect touch, contact, gestures, or other user input. The infrared sensors 208 may detect infrared wavelengths and signals. In another embodiment, the infrared sensors 208 may detect visible light or other wavelengths as well. The infrared sensors 208 may be configured to detect light or motion or changes in light or motion. Readings from the infrared sensors 208 and the optical sensors 204 may be configured to detect light or motion. The readings may be compared to verify or otherwise confirm light or motion. As a result, decisions regarding user input, biometric readings, environmental feedback, and other measurements may be effectively implemented in accordance with readings form the sensors 200 as well as other internal or external sensors and the user preferences. The infrared sensors 208 may also be integrated in the optical sensors 204.

The wireless earpieces 210 may include microphones 210. The microphones 210 may represent external microphones as well as internal microphones. The external microphones may positioned exterior to the body of the user as worn. The external microphones may sense verbal or audio input, feedback, and commands received from the user. The external microphones may also sense environmental, activity, and external noises and sounds. The internal microphone may represent an ear-bone or bone conduction microphone. The internal microphone may sense vibrations, waves, or sound communicated through the bones and tissue of the user's body (e.g., skull). The microphones 210 may sense content that is utilized by the virtual assistant of the wireless earpieces 202 to implement the processes, functions, and methods herein described. The audio input sensed by the microphones 210 may be filtered, amplified, or otherwise processed before or after being sent to the logic of the wireless earpieces 202.

In another embodiment, the wireless earpieces 202 may include chemical sensors (not shown) that perform chemical analysis of the user's skin, excretions, blood, or any number of internal or external tissues or samples. For example, the chemical sensors may determine whether the wireless earpieces 202 are being worn by the user. The chemical sensor may also be utilized to monitor important biometrics that may be more effectively read utilizing chemical samples (e.g., sweat, blood, excretions, etc.). In one embodiment, the chemical sensors are non-invasive and may only perform chemical measurements and analysis based on the externally measured and detected factors. In other embodiments, one or more probes, vacuums, capillary action components, needles, or other micro-sampling components may be utilized. Minute amounts of blood or fluid may be analyzed to perform chemical analysis that may be reported to the user and others. The sensors 200 may include parts or components that may be periodically replaced or repaired to ensure accurate measurements. In one embodiment, the infrared sensors 208 may be a first sensor array and the optical sensors 204 may be a second sensor array.

Figure 3:
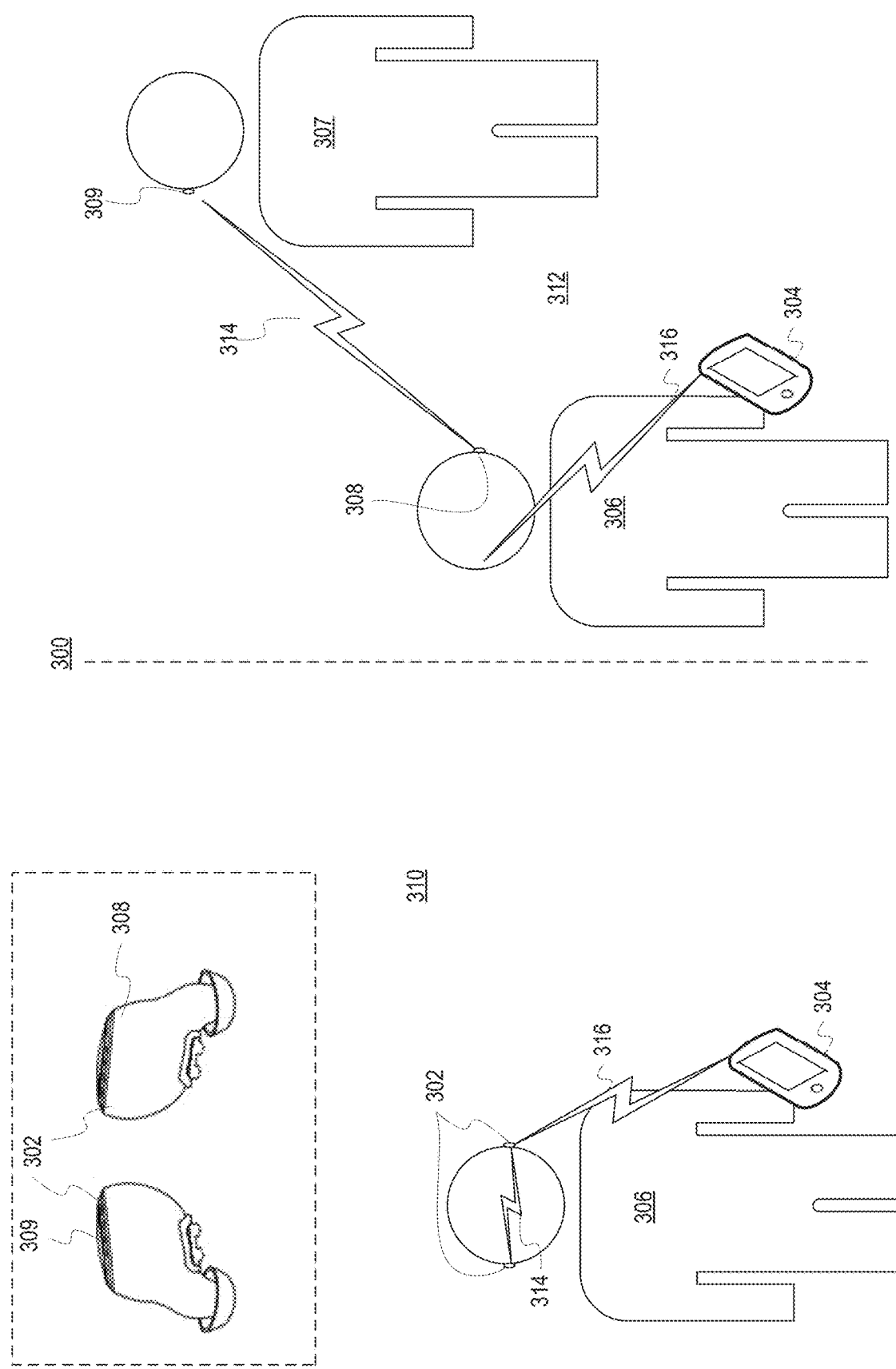
FIG. 3 is a pictorial representation of another communications environment in accordance with an illustrative embodiment.

FIG. 3 is a pictorial representation of another communications environment 300 in accordance with an illustrative embodiment. In one embodiment, the communications environment 300 may include wireless earpieces 302 that may communicate with a wireless device 304. The wireless earpieces 302 may be utilized by a first user 306 and a second user 307. The set of wireless earpieces 302 may include a first wireless earpiece 308 and a second wireless earpiece 309.

In one embodiment, the communications environment 300 represents utilization of the wireless earpieces 302 in a standard mode 310 and a sharing mode 312. The communications environment 300 further illustrates a wireless connection 314 between the wireless earpieces 302 and a wireless connection 316 between one or more of the wireless earpieces 302 and the wireless device 304.

In either the standard mode 310 or the sharing mode 312, the wireless earpieces 302 may function as stand-alone devices or may communicate with the wireless device 304 to receive streamed or discrete content. In one embodiment, the wireless earpieces 302 include processors, memories, and sensors that allow each of the wireless earpieces 3022 function and otherwise operate independent of each other and other devices.

In the standard mode 310, the wireless earpieces 302 communicate utilizing the connection 314. The connection 314 may represent a low power signal, such as NFMI, that may be used to send signals between the wireless earpieces 302. For example, the connection 314 may synchronize audio content played by the first wireless earpiece 308 and the second wireless earpiece 309. Similarly the connection 316 may be established with one or more of the wireless earpieces 3022 stream content, record biometric measurements, record environmental data, perform communications, and so forth. In the standard mode 310, the focus is on providing content to the user 306 and adapting to the user's 306 needs.

In the sharing mode 312, the connection 314 is amplified, boosted, or enhanced to facilitate communication between the first user 306 wearing the first wireless earpiece 308 and the second user 307 wearing the second wireless earpiece 309. In one embodiment, the wireless earpieces 302 may switch between utilizing an NFMI connection (and the associated transceivers) as the connection 314 to utilizing a Bluetooth, Wi-Fi, cellular, or other radio frequency or optical connection. In some examples, utilization of the sharing mode 312 may require greater processing and battery power that are worth it to the user's 306, 307 based on the functionality and features available in the sharing mode 312. In other examples, the power and resources required during the sharing mode 312 may be similar to those utilized in the standard mode 310.

In one embodiment, the wireless earpieces 302 may have one or more transceivers that may be utilized in the sharing mode 312 to communicate over greater distances. The type of connection and distance thresholds may expand as processors, memories, integrated circuits, circuit boards, chips, and transceivers continue to be further miniaturized (e.g., nanotechnology, ultracapacitors, graphene embodiments, etc.). As shown in the standard mode 310, the connection 314 may only need to communicate a small distance associated with a width of the head of the user 306. In the sharing mode 312, the wireless transceivers 302 may dynamically adjust the connection 314 based on the distance between the users 306, 307, the connection quality (e.g., throughput, error, latency, lag, etc.). The distance between the users may vary between a few feet to tens or hundreds of feet (or more) depending on the connection 314 being utilized. For example, when utilizing Bluetooth transceivers a typical viable range between the wireless transceivers of the wireless earpieces 302 may have a maximum range between about 300-400 feet (e.g., Bluetooth low energy, Bluetooth 5, etc.). In another example, when utilizing cell transceivers, the range may be increased to a maximum distance of between 1-6 miles.

The connection 316 may be established between the first wireless earpiece 308 and the wireless device 304 alone or with the second wireless earpiece 309 and the wireless device. One or both of the wireless earpieces 302 may be configured for communication with the wireless device 304. As a result, communications between each of the wireless earpieces 302 and the wireless device 304 (e.g., sent and received) may be synchronized through one or both of the wireless earpieces 302.

In other embodiments, additional users and wireless earpieces maybe similarly synchronized or communicate with each other.

Figure 4:
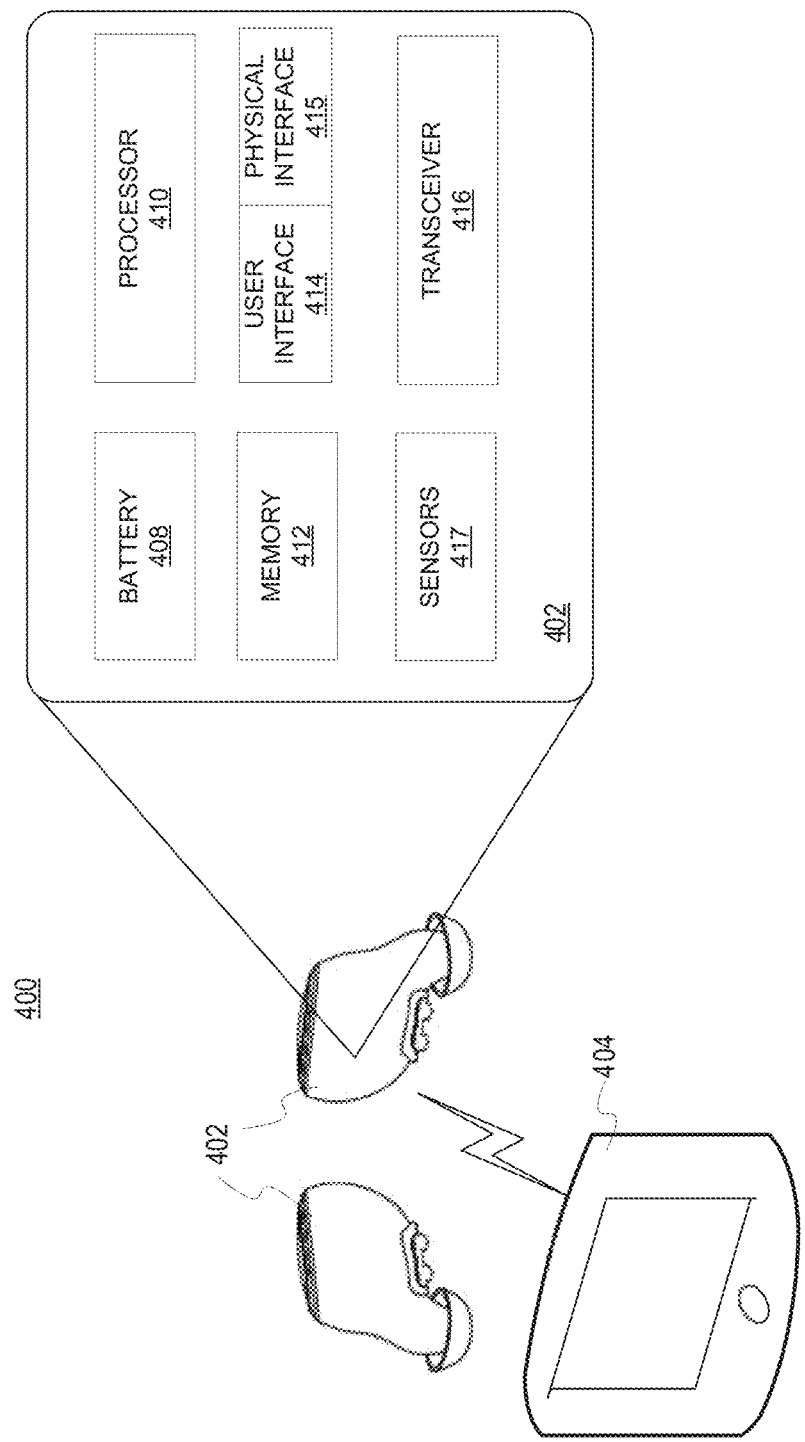
FIG. 4 is a block diagram of a wireless earpiece system 400 in accordance with an illustrative embodiment.

FIG. 4 is a block diagram of a wireless earpiece system 400 in accordance with an illustrative embodiment. As previously noted, the wireless earpieces 402 may be referred to or described herein as a pair (wireless earpieces) or singularly (wireless earpiece). The description may also refer to components and functionality of each of the wireless earpieces 402 collectively or individually. In one embodiment, the wireless earpiece system 400 may enhance communications and functionality of the wireless earpieces 402. In one embodiment, the wireless earpiece system 400 or wireless earpieces 402 may communicate directly or through one or more networks (e.g., Wi-Fi, mesh networks, cell networks, etc.).

As shown, the wireless earpieces 402 may be wirelessly linked to the wireless device 404. For example, the wireless device 404 may represent a smart phone. The wireless device 404 may also represent a gaming device, tablet computer, vehicle system (e.g., GPS, speedometer, pedometer, entertainment system, etc.), media device, smart watch, laptop, smart glass, or other electronic devices. User input, commands, and communications may be received from either the wireless earpieces 402 or the wireless device 404 for implementation on either of the devices of the wireless earpiece system 400 (or other externally connected devices).

In some embodiments, the wireless device 404 may act as a logging tool for receiving information, data, or measurements made by the wireless earpieces 402 together or separately. For example, the wireless device 404 may receive or download biometric data from the wireless earpieces 402 in real-time for two users utilizing the wireless earpieces 402. As a result, the wireless device 404 may be utilized to store, display, and synchronize data for the wireless earpieces 402 as well as manage communications. For example, the wireless device 404 may display pulse, proximity, location, oxygenation, distance, calories burned, and so forth as measured by the wireless earpieces 402. The wireless device 404 may be configured to receive and display an interface, selection elements, and alerts that indicate conditions for sharing communications. For example, the wireless earpieces 402 may utilize factors, such as changes in motion or light, distance thresholds between the wireless earpieces 402 and/or wireless device 404, signal activity, user orientation, user speed, user location, environmental factors (e.g., temperature, humidity, noise levels, proximity to other users, etc.) or other automatically determined or user specified measurements, factors, conditions, or parameters to implement various features, functions, and commands.

The wireless device 404 may also include any number of optical sensors, touch sensors, microphones, and other measurement devices (sensors 417) that may provide feedback or measurements that the wireless earpieces 402 may utilize to determine an appropriate mode, settings, or enabled functionality. The wireless earpieces 402 and the wireless device 404 may have any number of electrical configurations, shapes, and colors and may include various circuitry, connections, and other components.

In one embodiment, one or both of the wireless earpieces 402 may include a battery 408, a processor 410, a memory 412, a user interface 414, a physical interface 415, a transceiver 416, and sensors 417. The wireless device 404 may have any number of configurations and include components and features similar to the wireless earpieces 402 as are known in the art. The sharing functionality and logic may be implemented as part of the processor 410, user interface, or other hardware, software, or firmware of the wireless earpieces 402 and/or wireless device 404.

The battery 408 is a power storage device configured to power the wireless earpieces 402. In other embodiments, the battery 408 may represent a fuel cell, thermal electric generator, piezo electric charger, solar charger, ultra-capacitor, or other existing or developing power storage technologies. The processor 410 preserve the capacity of the battery 408 by reducing unnecessary utilization of the wireless earpieces 402 in a full-power mode when there is little or no benefit to the user (e.g., the wireless earpieces 402 are sitting on a table or temporarily lost). The battery 408 or power of the wireless earpieces are preserved for when being worn or operated by the user. As a result, user satisfaction with the wireless earpieces 402 is improved and the user may be able to set the wireless earpieces 402 aside at any moment knowing that battery life is automatically preserved by the processor 410 and functionality of the wireless earpieces 402. In addition, the battery 408 may use just enough power for the transceiver 416 for communicating across a distance separating users of the wireless earpieces 402.

The processor 410 is the logic that controls the operation and functionality of the wireless earpieces 402. The processor 410 may include circuitry, chips, and other digital logic. The processor 410 may also include programs, scripts, and instructions that may be implemented to operate the processor 410. The processor 410 may represent hardware, software, firmware, or any combination thereof. The processor 410 may also represent an application specific integrated circuit (ASIC) or field programmable gate array (FPGA). In one embodiment, the processor 410 may execute instructions to manage the wireless earpieces 402 including interactions with the components of the wireless earpieces 402, such as the user interface 414, transceiver 416, and sensors 417.

The processor 410 may utilize data and measurements from the transceivers 416 and sensors 417 to determine whether the wireless earpieces 402 are being utilized by different users. For example, distance, biometrics, user input, and other application information, data, and measurements may be utilized to determine whether a standard mode for a single user or sharing mode for multiple users are implemented by the processor 410 and other components of the wireless earpieces 402. The processor 410 may control actions implemented in response to any number of measurements from the sensors 417, the transceiver 416, the user interface 414, or the physical interface 415 as well as user preferences 420 that may be user entered or other default preferences. For example, the processor 410 may initialize a sharing mode in response to any number of factors, conditions, parameters, measurements, data, values, or other information specified within the user preferences 420 or logic. The processor 410 may control the various components of the wireless earpieces 402 to implement the sharing mode.

The processor 410 may implement any number of processes for the wireless earpieces 402, such as facilitating communications, listening to music, tracking biometrics or so forth. The wireless earpieces 402 may be configured to work together or completely independently based on the needs of the users. For example, the wireless earpieces 402 may be used by two different users at one time.

The processor 410 may also process user input to determine commands implemented by the wireless earpieces 402 or sent to the wireless device 404 through the transceiver 416. Specific actions may be associated with user input (e.g., voice, tactile, orientation, motion, gesture, etc.). For example, the processor 410 may implement a macro allowing the user to associate frequently performed actions with specific commands/input implemented by the wireless earpieces 402.

In one embodiment, a processor included in the processor 410 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 412 is a hardware element, device, or recording media configured to store data or instructions for subsequent retrieval or access at a later time. The memory 412 may represent static or dynamic memory. The memory 412 may include a hard disk, random access memory, cache, removable media drive, mass storage, or configuration suitable as storage for data, instructions, and information. In one embodiment, the memory 412 and the processor 410 may be integrated. The memory 412 may use any type of volatile or non-volatile storage techniques and mediums. The memory 412 may store information related to the status of a user, wireless earpieces 402, wireless device 404, and other peripherals, such as a tablet, smart glasses, a smart watch, a smart case for the wireless earpieces 402, a wearable device, and so forth. In one embodiment, the memory 412 may display instructions, programs, drivers, or an operating system for controlling the user interface 414 including one or more LEDs or other light emitting components, speakers, tactile generators (e.g., vibrator), and so forth. The memory 412 may also store thresholds, conditions, signal or processing activity, proximity data, and so forth.

The transceiver 416 is a component comprising both a transmitter and receiver which may be combined and share common circuitry on a single housing. The transceiver 416 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. In one embodiment, the transceiver 416 may be a hybrid or multi-mode transceiver that supports a number of different communications with distinct devices simultaneously. For example, the transceiver 416 may communicate with the wireless device 404 or other systems utilizing wired interfaces (e.g., wires, traces, etc.), NFC, or Bluetooth communications as well as with the other wireless earpiece utilizing NFMI. The transceiver 416 may also detect amplitudes and signal strength to infer distance between the wireless earpieces 402 as well as the wireless device 404.

The components of the wireless earpieces 402 may be electrically connected utilizing any number of wires, contact points, leads, busses, wireless interfaces, or so forth. In addition, the wireless earpieces 402 may include any number of computing and communications components, devices or elements which may include busses, motherboards, printed circuit boards, circuits, chips, sensors, ports, interfaces, cards, converters, adapters, connections, transceivers, displays, antennas, and other similar components. The physical interface 415 is hardware interface of the wireless earpieces 402 for connecting and communicating with the wireless device 404 or other electrical components, devices, or systems.

The physical interface 415 may include any number of pins, arms, or connectors for electrically interfacing with the contacts or other interface components of external devices or other charging or synchronization devices. For example, the physical interface 415 may be a micro USB port. In one embodiment, the physical interface 415 is a magnetic interface that automatically couples to contacts or an interface of the wireless device 404. In another embodiment, the physical interface 415 may include a wireless inductor for charging the wireless earpieces 402 without a physical connection to a charging device. The physical interface 415 may allow the wireless earpieces 402 to be utilized when not worn as a remote microphone and sensor system (e.g., seismometer, thermometer, light detection unit, motion detector, etc.). For example, measurements, such as noise levels, temperature, movement, and so forth may be detected by the wireless earpieces even when not worn. The wireless earpieces 402 may be utilized as a pair, independently, or when stored in a smart case. Each of the wireless earpieces 402 may provide distinct sensor measurements as needed. In one embodiment, the smart case may include hardware (e.g., logic, battery, transceiver, etc.) to integrate as part of a mesh network. For example, the smart case may be utilized as a node or relay within a mesh network for sending and receiving communications.

The user interface 414 is a hardware interface for receiving commands, instructions, or input through the touch (haptics) of the user, voice commands, or predefined motions. The user interface 414 may further include any number of software and firmware components for interfacing with the user. The user interface 414 may be utilized to manage and otherwise control the other functions of the wireless earpieces 402 including mesh communications. The user interface 414 may include the LED array, one or more touch sensitive buttons or portions, a miniature screen or display, or other input/output components (e.g., the user interface 414 may interact with the sensors 417 extensively). The user interface 414 may be controlled by the user or based on commands received from the wireless device 404 or a linked wireless device. In one embodiment, sharing modes and processes may be controlled by the user interface, such as recording communications, receiving user input for communications, sharing biometrics, queuing communications, sending communications, receiving user preferences for the communications, and so forth. The user interface 214 may also include a virtual assistant for managing the features, functions, and components of the wireless earpieces 402.

In one embodiment, the user may provide user input for the user interface 414 by tapping a touch screen or capacitive sensor once, twice, three times, or any number of times. Similarly, a swiping motion may be utilized across or in front of the user interface 414 (e.g., the exterior surface of the wireless earpieces 402) to implement a predefined action. Swiping motions in any number of directions or gestures may be associated with specific activities or actions, such as play music, pause, fast forward, rewind, activate a virtual assistant, listen for commands, report biometrics, enabled sharing communications, and so forth.

The swiping motions may also be utilized to control actions and functionality of the wireless device 404 or other external devices (e.g., smart television, camera array, smart watch, etc.). The user may also provide user input by moving his head in a particular direction or motion or based on the user's position or location. For example, the user may utilize voice commands, head gestures, or touch commands to change the processes implemented by the wireless earpieces 402 as well as the processes executed or content displayed by the wireless device 404. The user interface 414 may also provide a software interface including any number of icons, soft buttons, windows, links, graphical display elements, and so forth.

In one embodiment, the sensors 417 may be integrated with the user interface 414 to detect or measure the user input. For example, infrared sensors positioned against an outer surface of the wireless earpieces 402 may detect touches, gestures, or other input as part of a touch or gesture sensitive portion of the user interface 414. The outer or exterior surface of the user interface 414 may correspond to a portion of the wireless earpieces 402 accessible to the user when the wireless earpieces are worn within the ears of the user.

In addition, the sensors 417 may include pulse oximeters, accelerometers, thermometers, barometers, radiation detectors, gyroscopes, magnetometers, global positioning systems, beacon detectors, inertial sensors, photo detectors, miniature cameras, and other similar instruments for detecting user biometrics, environmental conditions, location, utilization, orientation, motion, and so forth. The sensors 417 may provide measurements or data that may be utilized to select, activate, or otherwise utilize the mesh network. Likewise, the sensors 417 may be utilized to awake, activate, initiate, or otherwise implement actions and processes utilizing conditions, parameters, values, or other data within the user preferences 420. For example, the optical biosensors within the sensors 417 may determine whether the wireless earpieces 402 are being worn and when a selected gesture to activate the virtual assistant 418 is provided by the user.

The wireless device 404 may include components similar in structure and functionality to those shown for the wireless earpieces 402. The computing device may include any number of processors, batteries, memories, busses, motherboards, chips, transceivers, peripherals, sensors, displays, cards, ports, adapters, interconnects, and so forth. In one embodiment, the wireless device 404 may include one or more processors and memories for storing instructions. The instructions may be executed as part of an operating system, application, browser, or so forth to implement the features herein described. In one embodiment, the wireless earpieces 402 may be magnetically, wirelessly, or physically coupled to the wireless device 404 to be recharged or synchronized or to be stored. In one embodiment, the wireless device 404 may include applications that are executed to enable sharing of the wireless earpieces 402 between users. For example, the sharing enablement or initiation may be selected from the wireless earpieces 402 themselves for from an application utilized by the wireless device 404 to communicate with the wireless earpieces 402. Separate applications executed by the wireless earpieces 402 and the wireless device 404 may function as a single application to enhance functionality, interface and interact, and perform the processes herein described.

The wireless device 404 may be utilized to adjust the user preferences 420 including settings, thresholds, activities, conditions, environmental factors, and so forth utilized by the wireless earpieces 402 and the wireless device 404. For example, the wireless device 404 may utilize a graphical user interface that allows the user to more easily specify any number of conditions, values, measurements, parameters, and factors that are utilized to perform communications and share content between the wireless earpieces 402.

In another embodiment, the wireless device 404 may also include sensors for detecting the location, orientation, and proximity of the wireless earpieces 402 to the wireless device 404. The wireless earpieces 402 may turn off communications to the wireless device 404 in response to losing a status or heart beat connection to preserve battery life and may only periodically search for a connection, link, or signal to the wireless device 404 or the other wireless earpiece(s). The wireless earpieces 402 may also turn off components, enter a low power or sleep mode, or otherwise preserve battery life in response to no interaction with the user for a time period, no detection of the presence of the user (e.g., touch, light, conductivity, motion, etc.), or so forth.

As originally packaged, the wireless earpieces 402 and the wireless device 404 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth. In one embodiment, the wireless earpieces 402 may include a smart case (not shown). The smart case may include an interface for charging the wireless earpieces 402 from an internal battery as well as through a plugged connection. The smart case may also utilize the interface or a wireless transceiver to log utilization, biometric information of the user, and other information and data. The smart case may also be utilized as a repeater, a signal amplifier, relay, or so forth between the wireless earpieces 402 or as part of a mesh network (e.g., a node in the mesh network).

Figure 5:
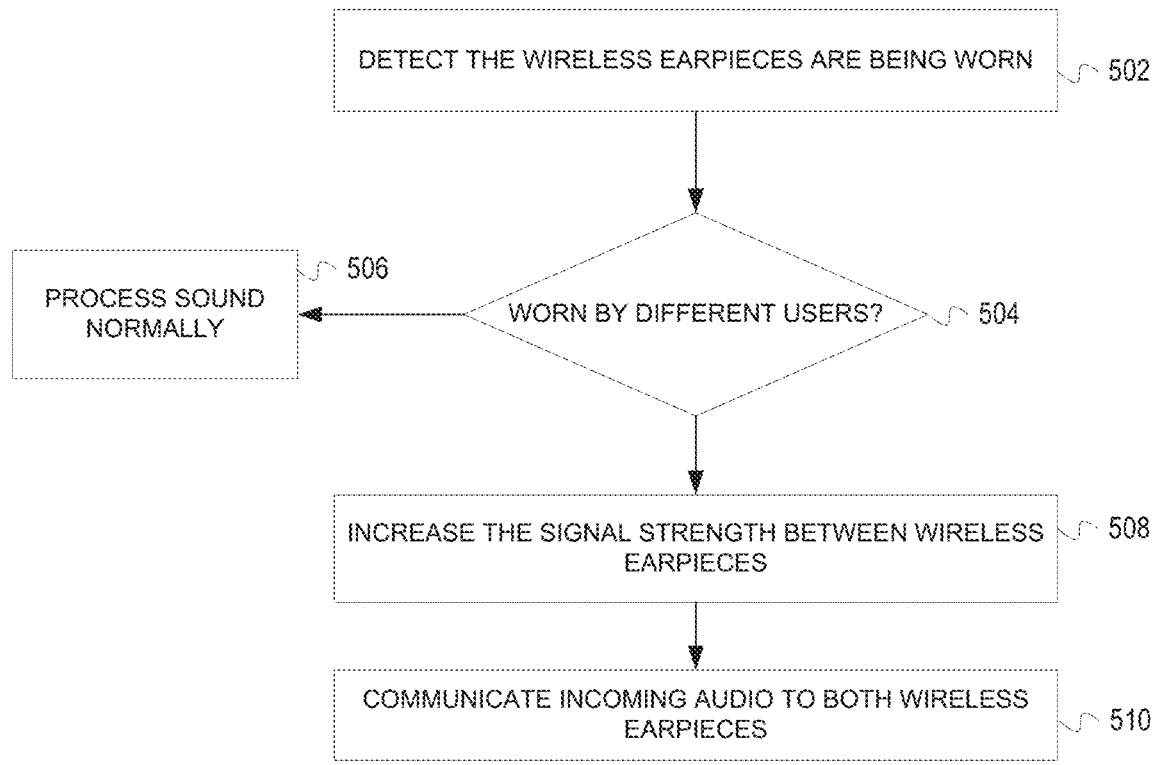
FIG. 5 is a flowchart of a process for sharing wireless earpieces between users in accordance with an illustrative embodiment.

FIG. 5 is a flowchart of a process for sharing wireless earpieces between users in accordance with an illustrative embodiment. In one embodiment, the process of FIGS. 5 and 6 may be implemented by each of the wireless earpieces of a set/pair independently or jointly. In another embodiment, the process of FIGS. 5 and 6 may be implemented by wireless earpieces 502 in communication with a wireless device 504 (jointly the "system"). The wireless earpieces and wireless device may represent devices, such as those shown in FIGS. 1 & 2.

The process may begin by detecting the wireless earpieces are being worn (step 502). The wireless earpieces may utilize any number of sensors to determine that they are each being worn or utilized. For example, the wireless earpieces may utilize optical sensors, touch sensors, contacts, accelerometers, or so forth. In one embodiment, the wireless earpieces may self-determine that they are being worn. In another embodiment, the wireless earpieces may receive user input or commands indicating that they are being worn or otherwise utilized. Step 502 may include any number of biometric and environmental measurements.

Next, the wireless earpieces determine whether they are being worn by different users (step 504). The wireless earpieces may determine whether different users are utilizing a left wireless earpiece and a right wireless earpiece utilizing any number of processes, information, data, or measurements. In one embodiment, the wireless earpieces may utilize one or more of the distance between the wireless earpieces, skin/tissue conductivity, ear mapping, voice profile, user identifier (detected or provided by the respective users), or so forth. The wireless earpieces may utilize any number of thresholds or data to determine whether distinct users are utilizing the wireless earpieces. For example, if the distance between wireless earpieces is greater than one foot the wireless earpieces may determine a sharing mode or configuration is applicable. The distance between wireless earpieces may be determined utilizing one or more transceivers or other applicable information.

If the wireless earpieces determine that they are not worn by different users in step 504, the wireless earpieces process found normally (step 506). During step 506, the wireless earpieces function as if being utilized by a single user regardless of whether the user is utilizing both or only one of the wireless earpieces.

If the wireless earpieces determine that they are being worn by different users in step 504, the wireless earpieces increase the signal strength between the wireless earpieces (step 508). During step 508, the signal, link, or connection between wireless earpieces is verified, strengthened, or otherwise secured.

Next, the wireless earpieces communicate incoming audio to both of the wireless earpieces (step 510). In one embodiment, the incoming audio is sent by an associated wireless device, such as a smart phone, tablet, computer, vehicle system, gaming system, or other communications or computing system or device. The incoming audio may represent a communication, any number of sounds or audio, audio associated with media content (e.g., video, virtual reality, augmented reality, etc.).

Figure 6:
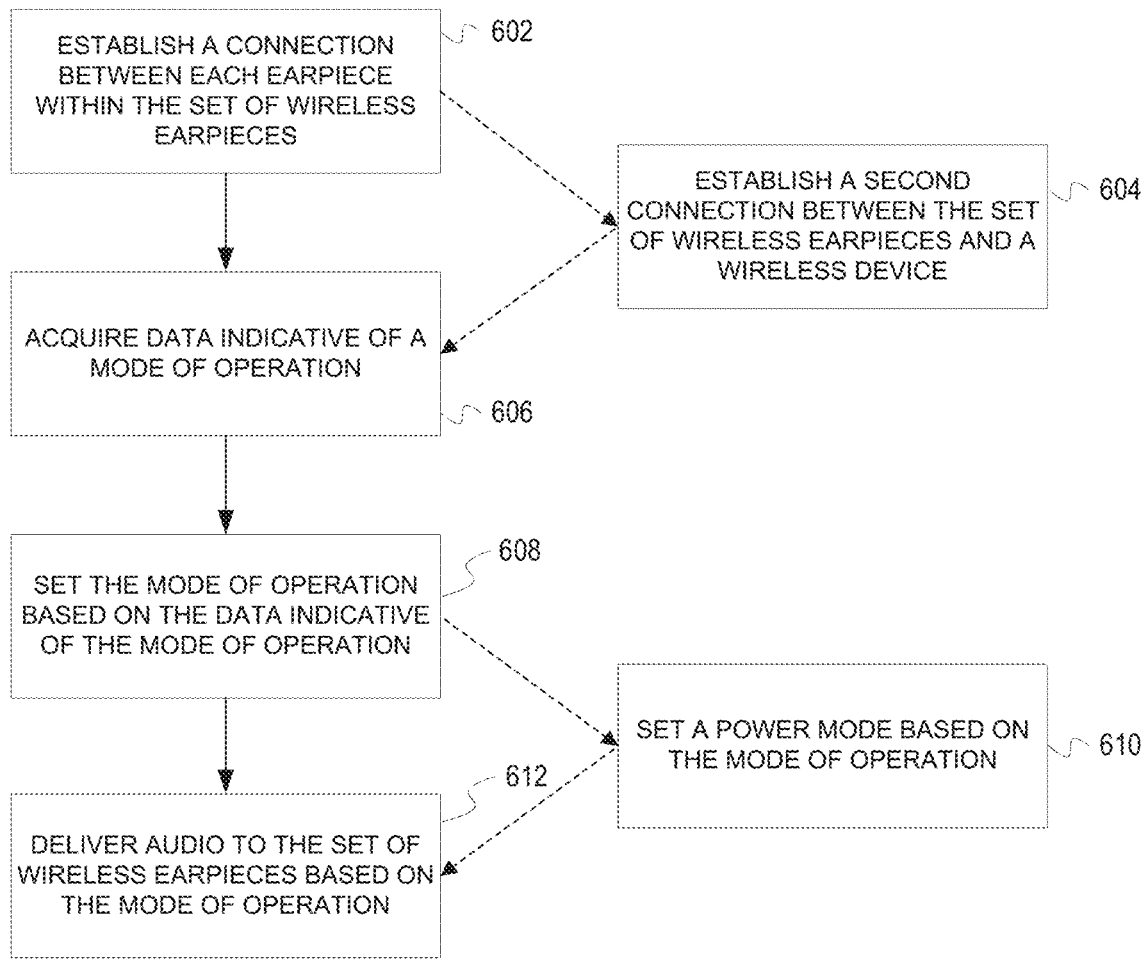
FIG. 6 is a flowchart of another process for using a set of wireless earpieces in accordance with an illustrative embodiment.

FIG. 6 is a flowchart of a method of using a set of wireless earpieces. The process of FIG. 6 may be combined with the process of FIG. 5 or may represent additional processes and functionality that may be implemented. In one embodiment, the method may begin by establishing a connection between each earpiece of a set of wireless earpieces (step 602). The set of wireless earpieces may include two or more wireless earpieces used by one or more users, and each earpiece need not be identical to one another. The connection may be established automatically upon removing one or more of the earpieces from an electric or smart case, in response to a haptic or verbal command from a user, or in accordance with one or more programs or algorithms executed by one or more processors associated with one or more of the wireless earpieces. In addition, a password, code, identifier, pin, or other information may be required to establish the connection. For example, a spoken numerical identifier with a tactile code (e.g., forward swipe across the wireless earpiece) may be required to establish a connection.

Optionally, a second connection between one or more of the earpieces within the set of wireless earpieces and a wireless device (step 604) may be established. The wireless device may be a smartphone, a tablet, or another electronic wearable and may be used to view processes and functions related to one or more of the wireless earpieces or control the functionality of one or more of the wireless earpieces. For example, an app may be executed on a smartphone allowing a user to establish a communications link with one or more of the earpieces, view information associated with an earpiece connection such as connection speed or latency, view sensor data received by one or more of the earpieces, or perform other related functions.

Next, the set of wireless earpieces acquire data indicative of a mode of operation (step 606). The data may be acquired from one or more sensors associated with one or more of the wireless earpieces and communicated via the connection to one or more of the other wireless earpieces, a user wearing one or more of the wireless earpieces and communicated via the connection to one or more of the other wireless earpieces, or from a processor or transceiver. For example, one or more of the sensors may be a global positioning sensor that receives global positioning data from a satellite, which can be used by a processor for determining a distance between one or more of the wireless earpieces. In addition, a user may obtain similar data from another device (such as a smartphone) and communicate the data to one or more of the wireless earpieces. Furthermore, a processor of one or more of the wireless earpieces may use signal strength data associated with a connection between one or more of the other wireless earpieces to determine a distance between the earpiece associated with the processor and one or more of the wireless earpieces. Finally, the data may also include biometric data for identifying a user to allow the user to use one of the wireless earpieces.

Next, the set of wireless earpieces set a mode of operation to operate the set of wireless earpieces based on the data indicative of the mode of operation (step 608). For example, if data from a global positioning sensor communicated from one or more second earpieces of the set of wireless earpieces indicates that the earpiece is two meters from the position of a first earpiece using the global positioning data, then the first earpiece may set the mode of operation to a sharing mode of operation since it is very unlikely that a single user is using both earpieces if the distance between the earpieces is two meters. However, if the global positioning data indicates that the distance between the first earpiece and one or more second earpieces is twenty-three centimeters (roughly the distance between the ears of a normal person), then the first earpiece may set the mode of operation to a standard mode, as it is likely that a single user is using both earpieces. A similar process may be used using a signal strength between two or more earpieces within the set of wireless earpieces. If a signal strength associated with the connection between the first earpiece and one or more second earpieces falls below a threshold (such as due to latency or lag), then the processor of the first earpiece may set the mode of operation to a shared mode of operation, as a weaker signal is more likely to be indicative of more than one user. In addition, if the signal strength is below a threshold and the mode of operation is set to a shared mode of operation, the signal strength may be boosted to improve the connections between the first earpiece and one or more second earpieces. Furthermore, the sharing mode of operation may be secured in response to a successful identification of two or more users. The identification of each user may be verified by comparing sensor data against data stored in a memory of one of the wireless earpieces or through the use of an identifier such as a password. Finally, setting a shared mode of operation may require switching between one or more different transceivers of a wireless earpiece. For example, if the distance between two or more earpieces is of a sufficient distance, one or more of the earpieces may switch from a NFMI transceiver to a BLUETOOTH, WiMax, or other type of radio transceiver for communicating over the greater distance.

Optionally, a power mode may be set based on the mode of operation (step 610). If the mode of operation is the standard mode of operation, then the power mode may be set for full power for each earpiece to take advantage of stereophonic capabilities of the wireless earpieces. If the mode of operation is the shared mode of operation, then a lower power mode may be established in order to maximize the battery life of each earpiece (since only one user may have access to an earpiece case for recharging).

Next, audio may be delivered to one or more speakers of each earpiece of the set of wireless earpieces (step 612). If the mode of operation is set to a standard mode of operation, then a first audio signal is delivered to a speaker of the first earpiece and a second audio signal is delivered to a speaker of one or more second earpieces. If the mode of operation is set to a shared mode of operation, then a third audio signal derived from the first audio signal and the second audio signal is delivered via one or more connections to each earpiece of the set of wireless earpieces. The third audio signal may be dynamically adjusted based upon the distance between two or more of the earpieces or based upon a connection quality associated with one or more of the connections between the set of wireless earpieces. In addition, if the mode of operation is the shared mode of operation, one or more users may establish a bidirectional communication channel via one or more of the connections between two or more earpieces within the set of wireless earpieces. Furthermore, in the shared mode of operation, the set of wireless earpieces may be utilized to coordinate communications, content distribution (e.g., streaming), sensor readings (e.g., sharing, recording, averaging, etc.), and any number of other processes that may be performed by the wireless earpieces.

Figure 7:
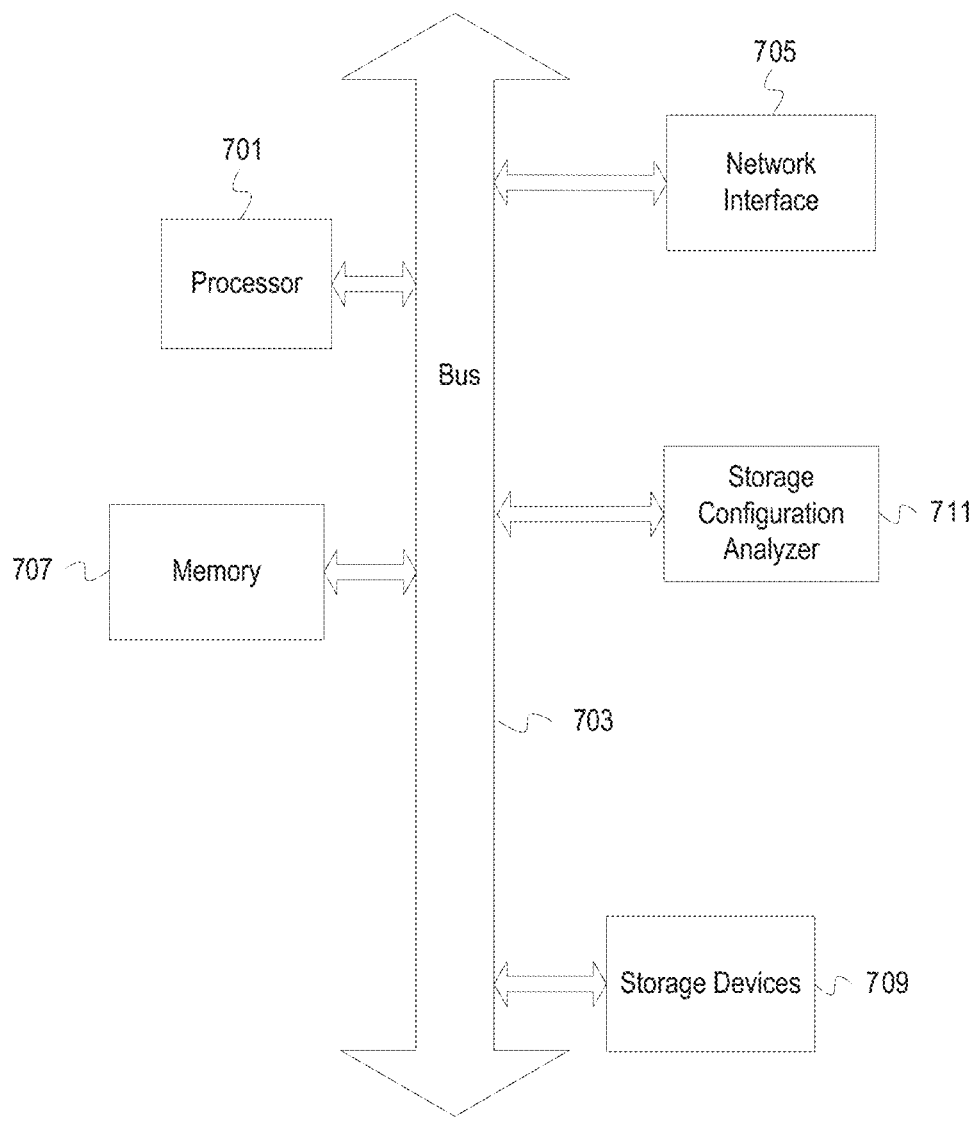
FIG. 7 depicts a computing system in accordance with an illustrative embodiment.

FIG. 7 depicts a computing system 700 in accordance with an illustrative embodiment. For example, the computing system 700 may represent a device, such as the wireless device 104 of FIG. 1. The computing system 700 includes a processor unit 701 (possibly including multiple processors, multiple cores, multiple nodes, and/or implementing multi-threading, etc.). The computing system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 703 (e.g., PCI, ISA, PCI-Express, HyperTransport®, InfiniBand®, NuBus, etc.), a network interface 706 (e.g., an ATM interface, an Ethernet interface, a Frame Relay interface, SONET interface, wireless interface, etc.), and a storage device(s) 709 (e.g., optical storage, magnetic storage, etc.).

The system memory 707 embodies functionality to implement all or portions of the embodiments described above. The system memory 707 may include one or more applications or sets of instructions for implementing a sharing mode with one or more wireless earpieces. In one embodiment, specialized sharing software may be stored in the system memory 707 and executed by the processor unit 702. As noted, the sharing application or software may be similar or distinct from the application or software utilized by the wireless earpieces. Code may be implemented in any of the other devices of the computing system 700. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701. The computing system 700 may further include any number of optical sensors, accelerometers, magnetometers, microphones, gyroscopes, temperature sensors, and so forth for verifying user biometrics, or environmental conditions, such as motion, light, or other events that may be associated with the wireless earpieces or their environment.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method of using a set of wireless earpieces comprising:
    establishing a connection between each earpiece within the set of wireless earpieces;
    acquiring data indicative of a mode of operation;
    setting the mode of operation to operate the set of wireless earpieces based on the data indicative of the mode of operation; and
    delivering audio to one or more speakers of each earpiece of the set of wireless earpieces based on the mode of operation;
    wherein the mode of operation is from a set comprising a standard mode of operation and a shared mode of operation;
    wherein in the standard mode of operation the audio comprises a first audio signal delivered to at least one speaker of a first earpiece within the set of wireless earpieces and a second audio signal delivered to at least one speaker of a second earpiece within the set of wireless earpieces; and
    wherein in the shared mode of operation the audio comprises a third audio signal based on the first audio signal and the second audio signal, the third audio signal delivered to at least one speaker of both the first earpiece within the set of wireless earpieces and the at least one second earpiece within the set of wireless earpieces.

2. The method of claim 1, wherein the data indicative of the mode of operation includes biometric information associated with at least one user.

3. The method of claim 1, wherein the connection provides for bidirectional communication between each earpiece of the set of wireless earpieces.

4. The method of claim 1, wherein the third audio signal in the shared mode of operation is dynamically adjusted based upon a distance between the first earpiece and the at least one second earpiece of the set of wireless earpieces.

5. The method of claim 4, wherein the distance is determined from a signal strength associated with the connection.

6. The method of claim 1, wherein the third audio signal in the shared mode of operation is dynamically adjusted based upon connection quality.

7. The method of claim 6, wherein the connection quality includes latency, lag, throughput, and error rate.

8. The method of claim 1, further comprising establishing a second connection between the first earpiece of the set of wireless earpieces and a wireless device.

9. The method of claim 8, wherein the second connection in the shared mode of operation is dynamically adjusted based upon a distance between the first earpiece and the wireless device.

10. The method of claim 9, wherein the determining of the distance between the first earpiece of the set of wireless earpieces and the wireless device is based upon a signal strength associated with the second connection.

11. The method of claim 1, further comprising setting a power mode based on the mode of operation.

12. A set of wireless earpieces, wherein each earpiece comprises:
an earpiece housing having an extension configured to fit substantially within an ear;
a processor disposed within the earpiece housing;
a plurality of sensors operatively connected to the processor; and
a transceiver operatively connected to the processor;
wherein the set of wireless earpieces are configured to establish a connection with each earpiece within the set of wireless earpieces, acquire data indicative with a mode of operation, set the mode of operation for operating the set of wireless earpieces based upon the data indicative of the mode of operation, and deliver audio to one or more speakers of each earpiece of the set of wireless earpieces based on the mode of operation;
wherein the mode of operation is from a set comprising a standard mode of operation and a shared mode of operation;
wherein in the standard mode of operation the audio comprises a first audio signal delivered to at least one speaker of a first earpiece within the set of wireless earpieces and a second audio signal delivered to at least one speaker of a second earpiece within the set of wireless earpieces; and
wherein in the shared mode of operation the audio comprises a third audio signal based on the first audio signal and the second audio signal, the third audio signal delivered to at least one speaker of both the first earpiece within the set of wireless earpieces and the second earpiece within the set of wireless earpieces.

13. The set of wireless earpieces of claim 12, wherein at least one first sensor of the plurality of sensors for each earpiece is located on the extension.

14. The set of wireless earpieces of claim 13, wherein the at least one first sensor of the plurality of sensors for each earpiece is an optical sensor for determining an identity.

15. The set of wireless earpieces of claim 12, wherein at least one second sensor of the plurality of sensors of each earpiece is a global positioning sensor and the data indicative of the mode of operation includes global positioning data detected by the global positioning sensor of each earpiece for dynamically adjusting the connection.

16. The set of wireless earpieces of claim 12, wherein the third audio signal is dynamically adjusted based upon a connection quality.

17. The set of wireless earpieces of claim 12, wherein the connection provides for bidirectional communication between each earpiece of the set of wireless earpieces.

18. The set of wireless earpieces of claim 13, wherein the set of wireless earpieces are configured to set a power mode based on the mode of operation.

19. The set of wireless earpieces of claim 15, wherein the first earpiece of the set of wireless earpieces includes a second transceiver for establishing a second connection with the second earpiece of the set of wireless earpieces if a distance based upon the global positioning data between the first earpiece and the second earpiece exceeds a threshold.

20. The set of wireless earpieces of claim 19, wherein the first earpiece of the set of wireless earpieces is configured to establish a third connection with a wireless device via the second transceiver.

* * * * *